United States Patent [19]

Dorsch

[11] 4,132,310
[45] Jan. 2, 1979

[54] SHIPPING SYSTEM FOR LIQUIDS AND POWDERS

[75] Inventor: Robert E. Dorsch, South Bend, Ind.

[73] Assignee: Uniroyal, Inc., New York, N.Y.

[21] Appl. No.: 688,655

[22] Filed: May 21, 1976

[51] Int. Cl.² ............................................. B65D 19/38
[52] U.S. Cl. .................................................. 206/386
[58] Field of Search ............... 220/1.5; 206/386, 83.5, 206/597; 105/365; 150/1

[56] References Cited

U.S. PATENT DOCUMENTS

| | | | |
|---|---|---|---|
| 2,005,117 | 6/1935 | Tamplin | 206/597 |
| 2,534,010 | 12/1950 | Frye | 206/386 |
| 2,696,360 | 12/1954 | Toffolon | 206/386 |
| 3,008,572 | 11/1961 | Wagner | 206/386 |
| 3,312,181 | 4/1967 | Davidson | 206/386 |
| 3,331,496 | 7/1967 | Marsden et al. | 206/597 |
| 3,390,765 | 7/1968 | Grant | 206/386 |
| 3,416,762 | 12/1968 | Headrick | 220/1.5 |
| 3,472,363 | 10/1969 | Rustin, Jr. et al. | 206/386 |
| 3,510,142 | 5/1970 | Erke | 150/1 |

*Primary Examiner*—Herbert F. Ross
*Attorney, Agent, or Firm*—Steven H. Bazerman

[57] ABSTRACT

A shipping harness assembly for use with collapsible containers to permit such containers, when filled with a liquid or dry powdered solid substances, to be "containerized" in cargo boxes for transoceanic movement by boat. The cargo boxes may also be positioned on truck or railway car beds for distribution on land. The shipping harness stabilizes the collapsible container, which is positioned on its side in the cargo box, through the provision of a plurality of straps encircling the collapsible container along its length and a plurality of straps positioned across said encircling straps in a direction generally parallel to the axis of the collapsible container. Each strap is anchored to the floor of the cargo box.

21 Claims, 15 Drawing Figures

SHIPPING SYSTEM FOR LIQUIDS AND POWDERS

BACKGROUND OF THE INVENTION

This invention relates to an apparatus and method for transporting liquids and dry powdered solids in collapsible containers and more particularly to a shipping harness for use with such collapsible containers which will allow them to be mounted in cargo boxes suitable for containerized use both in sea and land.

Traditionally, liquids, such as petroleum products, latex, dyes and powdered dry materials, have been shipped in metal drums, most commonly in 55 gallon steel drum. Such containers, if made of aluminum, stainless steel, or non-ferrous metals, are expensive, and if made of steel, tend to rust unless they are frequently cleaned and repainted. When chemically active fluids are shipped in such metal drums, the drums, by necessity, must be made of stainless steel or other non-reactive metals.

For shipment of large quantities of such liquids by sea, cargo tanks are commonly used which form an integral part of the cargo ships. They are loaded by pumping the fluid cargo from storage tanks, trucks, or other delivery means on the dock. The cargo tanks are located along the bottom of the ships and are covered by flooring on which conventional cargo is loaded. Such cargo tanks can normally carry between 30,000 and 100,000 gallons of liquid. When such tanks are used there is considerable delay in both loading and unloading of the liquid. The other cargo, wich is positioned over the tanks, must be loaded and unloaded by conventional techniques before the liquids may be added to or removed from the tank. This causes delay which vary from a matter of several days to up to 2 weeks at a time.

Recently stainless steel tanks approximately 20 feet long by 8 feet wide by 8½ feet high have been used to ship such liquids. The tanks are mounted in protective cargo boxes of approximately the same size as the tanks. Loaded tanks in their cargo boxes may be transferred directly from the ship to truck or train beds. These stainless steel tanks are extremely expensive and of course are not collapsible. Thus, when they are returned to the filling point they represent considerable wasted space on board ship and thus a large resulting expense.

Collapsible containers, such as disclosed in U.S. Pat. Nos. 2,612,924 and 2,613,169, both issued on Oct. 7, 1952 to M. M. Cunningham, formed from coated cord fabrics have come into common usage for transporting liquids and dry powders. These containers have the advantage of being collapsible when not filled, allowing inexpensive return shipment to their point of origin. Such collapsible containers are formed from rubber or plastic compounds which are in general non-reactive with most cargos and which can be specially compounded to be non-reactive with specific cargos.

In general such collapsible containers, when used as transoceanic shipping containers, have had a 55 gallon capacity and have been shipped in the same fashion as 55 gallon metal drums. They are either wedged in place in a vertical position by use of sufficient containers to entirely fill the cargo area or are tied in position.

It would be preferable to use much larger collapsible containers to ship liquids by sea both for the ease of their return shipment and because of the cost advantage over the use of many small collapsible containers.

Some attempts have been made to use such larger collapsible containers for shipment of liquids on land. For example, in the patent to Erke, U.S. Pat. No. 3,510,142, a collapsible tank is disclosed mounted on the bed of a truck and having several straps positioned along its length to hold the container on the truck bed. The construction shown would allow considerable shifting of the liquid when the truck was in motion. Erke contemplates the loading of liquids into the collapsible container only after the collapsible container is mounted on its bed. It would be a difficult if not impossible task to move such a fully loaded collapsible container onto a ship. To load a collapsible container by pumping the fluid from the dock into an empty container aboard the ship would have little or no advantage over the existing tank system. Further even if it was possible to move such a loaded container onto the ship, the restraining means disclosed by Erke would be insufficient to prevent the motion of a ship from causing displacement of the non-rigid collapsible container with corresponding displacement of the other cargo, change in the ship's trim and the likelihood of rupture of the collapsible container.

It would be highly desirable to use one or more collapsible containers in a containerized cargo box which box would be suitable for positioning on ships fully loaded and which could also be moved from shipboard directly onto train or truck beds. However the use of such collapsible containers placed directly in containerized cargo boxes present serious problems. Shifts of weight during normal operation of a cargo vessel, truck or train would result in shifts in the position of the collapsible containers within the cargo box. Unless the cargo box was heavily reinforced, it would collapse due to such shifting. Such reinforcement would be impracticable because of the extra weight and expanse. This problem is particularly evident for shipboard use both because of the violent movement inherent in such travel and because, as a matter or economy, it is necessary that there be only minimal spacing of no more than several inches between the walls of the collapsible container and the cargo box in which it is mounted. This necessitates a system for mounting the collapsible container which allow essentially no movement of the collapsible container within its containerized cargo box.

SUMMARY OF THE INVENTION

The present invention is a system for containerizing collapsible containers in cargo boxes such that they can be used for the transportation of liquids and dry powdered solids on sea and land. According to the present invention a shipping harness holds the collapsible container in place even during violent movement of the transporting vehicle without rupturing the walls of its containerized cargo box and without allowing any major shift in the collapsible container's weight distribution or position in the cargo box.

The shipping harness consists of a system or web of encircling and longitudinal straps as will be more fully disclosed herein. The straps are positioned on the collapsible container prior to its filling. Some of the straps are positioned circumferentially around the collapsible container and some straps are positioned longitudinally along the collapsible container. The straps forming the shipping harness are attached to the floor of the containerized cargo box. The positioning of the straps are calculated to give maximum support to the loaded collapsible container and to eliminate any possibility of its movement.

BRIEF DESCRIPTION OF THE DRAWINGS

The above and other features of the present invention will be more fully understood from the following description read in connection with the accompanying drawings wherein.

DESCRIPTION OF THE PREFERRED EMBODIMENT

Figures 1, 2:
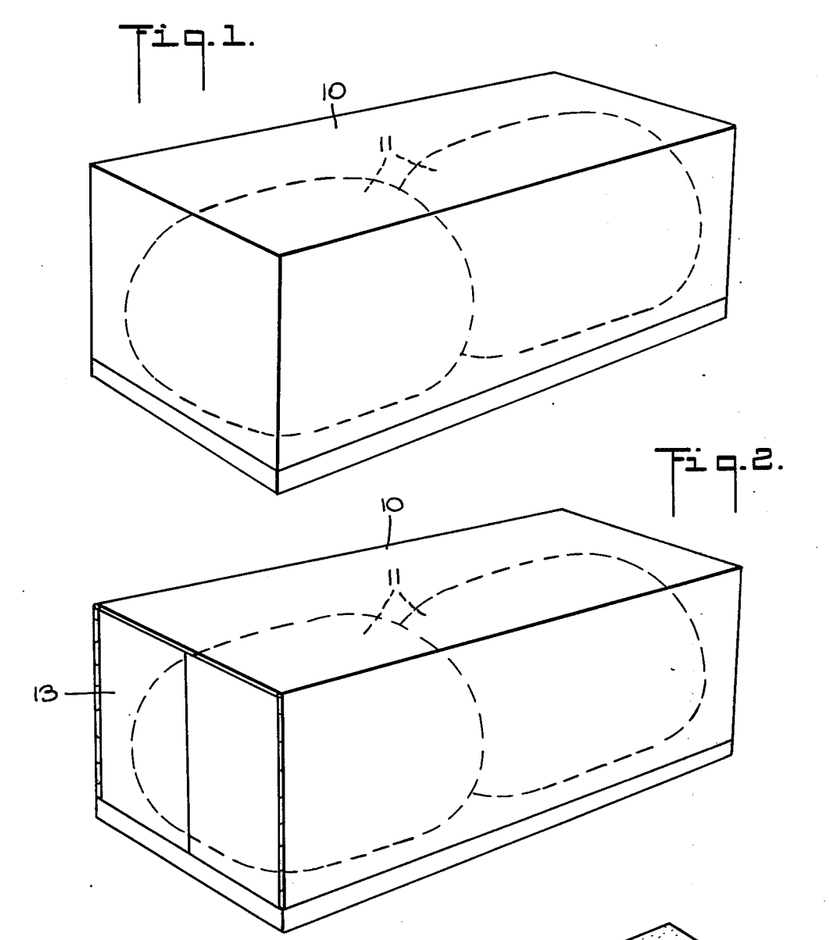
FIG. 1 is a prospective view of a containerized cargo box containing two collapsible containers in accordance with the present invention.
FIG. 2 is a prospective view of the cargo box of FIG. 1 rotated 180° in a horizontal plane.

Referring to the drawings and particularly FIGS. 1 and 2, a containerized cargo box 10 has mounted therein two collapsible containers 11 having generally flexible cylindrical bodies formed from fabric of reinforcing cords embedded in rubber or similar plastic material. One end of the cargo box 10 has access doors 13 to allow entry onto the containerized cargo box 10 for positioning, harnessing and filling the collapsible container 11.

As can be seen more fully in FIGS. 3, 6, 7 and 8, the collapsible containers 11 are positioned on their sides in cargo box 10. Each collapsible container 11 has a metal primary anchoring means 15 centrally positioned on its face 20 closest to the cargo access door 13. Primary anchoring means 15 is mounted in an opening in and sealed to face 20 to provide a strong, fluid tight anchoring means for reinforcing cables 14. Each of the reinforcing cables 14 is, at its other end, secured to one of the secondary anchoring means 16 dispersed about the face 20' of each collapsible container 11 opposite primary anchoring means 15. Each secondary anchoring means 16 consists of a metal anchoring plate mounted on and passing through the walls of the collapsible container 11. The secondary anchoring means 16 are attached to their respective collapsible container 11 with a fluid tight seal. Cables 14 act to limit the maximum distance between the end faces 20 and 20' and thus maintain the shape of the collapsible container 11 when loaded.

The primary attaching means 15 may have an eyelet 17 exterior to the body of its collapsible container 11 to allow the collapsible container 11 to be attached to a crane or the like for movement exterior of the cargo box when unloaded. When loaded with a liquid, the collapsible container 11 would be of insufficient strength for such movement by a crane and would, in all likelihood, burst in such an attempt.

On the face 20' of each of the collapsible containers 11 opposite the primary attaching means 15, is positioned a metal plate 17. Plate 17 is fluid tightly but detachably mounted on the collapsible container 11. Plate 17 allows entry for attachment and adjustment of cables 14 to primary anchoring means 15 and secondary anchoring means 16.

Mounted on face 20 is an inlet pipe 19 secured thereto in a fluid tight manner. The inlet pipe 19 is positioned near the floor 18 of the cargo box 10 and is in direct communication with the interior of its collapsible container 11 to allow the same to be filled or emptied. Inlet pipe 19 has a valve 19' attached to it for controlling the entry of fluid into the collapsible container 11.

When fully loaded, a collapsible container 11 is held in position in the cargo box 10 by a shipping harness 21 which is in turn fixedly attached to the cargo box floor 18. As can be seen most clearly in FIGS. 11, 12 and 13, each shipping harness 21 consists of five continuous circumferential straps 22, 23, 24, 25 and 26 made from suitable webbing of natural or synthetic material of sufficient strength to withstand the stresses developed due to movement of the cargo box in transit. For example, four inch strips of nylon are commercially available having a rated level of 6,000 pounds per inch of width at 18 percent elongation more than sufficient for use in the shipping harness 21. The five circumferential straps 22–26 are each made by sewing together or otherwise attaching strapping material at their respective ends 22', 23', 24', 25' and 26' to form closed loops. The straps 22–26 are of just sufficient length to securely encircle and hold a fully loaded collapsible container 11 in position. Accordingly circumferential straps 22–26 should have an overall length slightly less than the circumference of the fully loaded collapsible container to aid the circumferential straps 22–26 to grip the flexible walls of its collapsible container 11. For example, when the circumferential straps 22–26 are formed from 4 inch strips of nylon, the circumferential straps 22–26 should be 6 percent less than the circumference of a loaded container 11.

Each of the five circumferential straps 22–26 are held in position parallel to each other by two long longitudinal straps 27 and 29 and four shorter longitudinal straps 28, 30, 31 and 32 positioned across and exterior to the outer surface of each of the circumferential straps 22–26.

Figure 11:
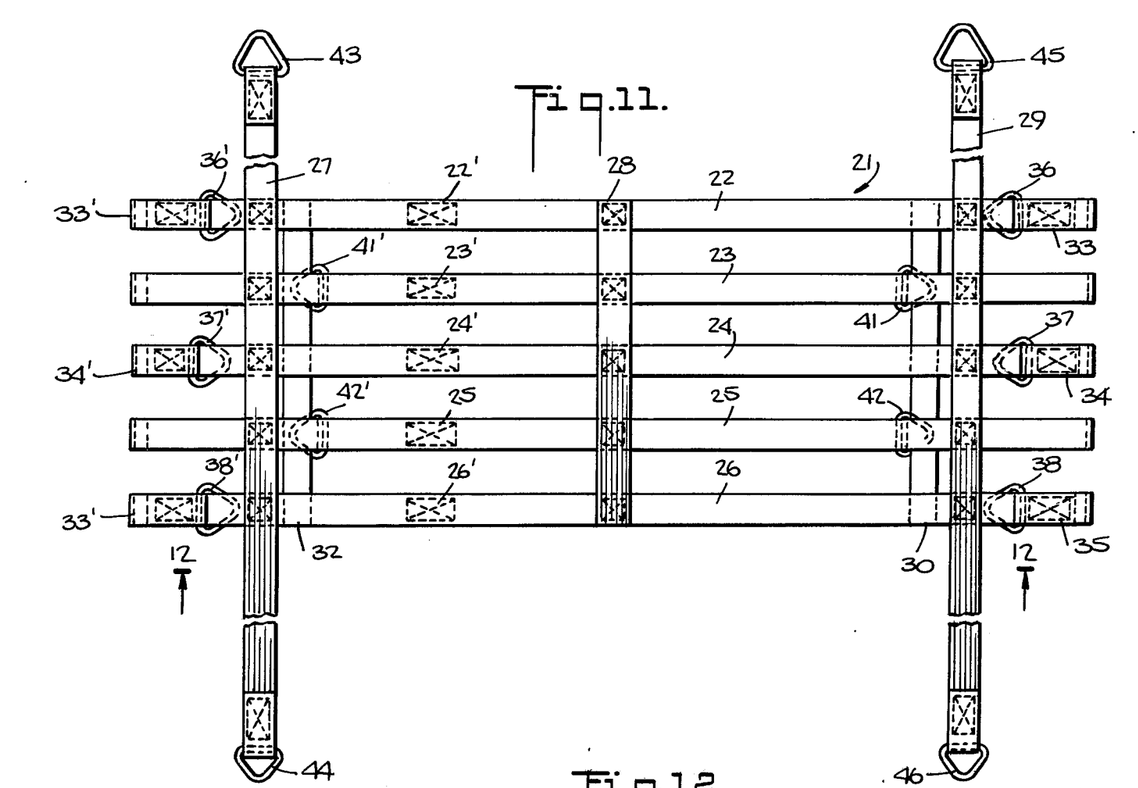
FIG. 11 is a top view of a shipping harness in accordance with the present invention.
Figure 13:
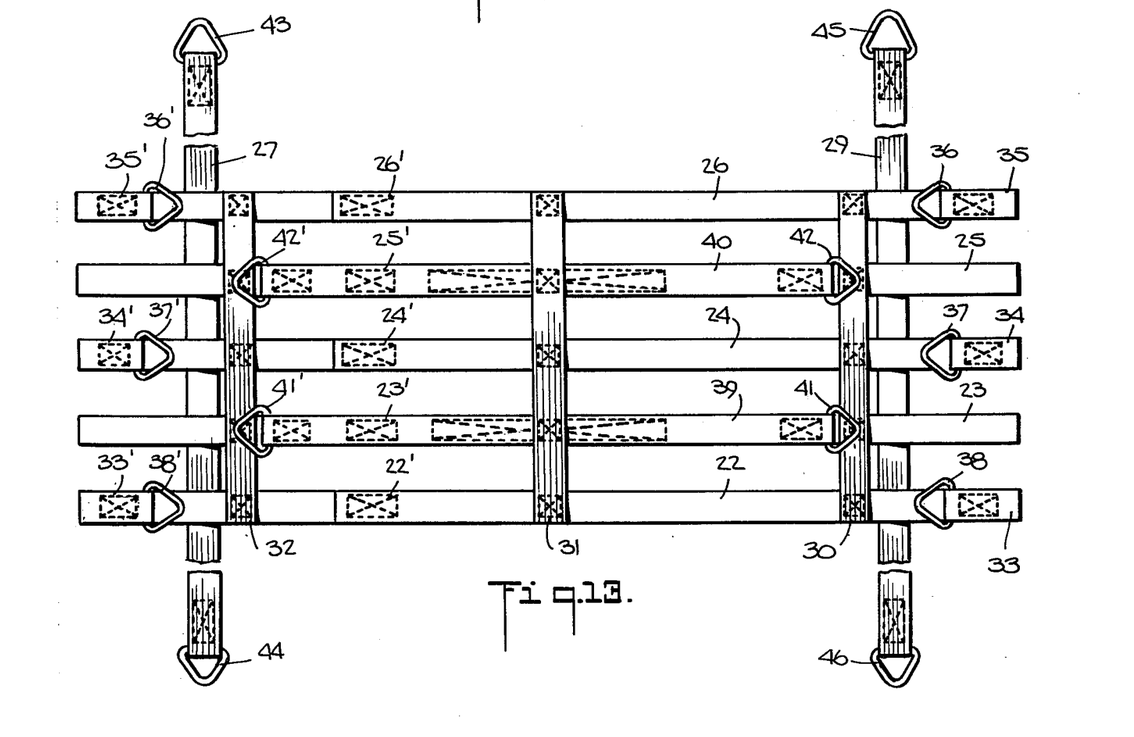
FIG. 13 is a bottom view of a shipping harness in accordance with the present invention.

As can be seen from FIGS. 11 and 13, short longitudinal straps 28, 30, 31 and 32 are of a length to exactly fit across and be in contact with each of the circumferential straps 22–26.

Figure 12:
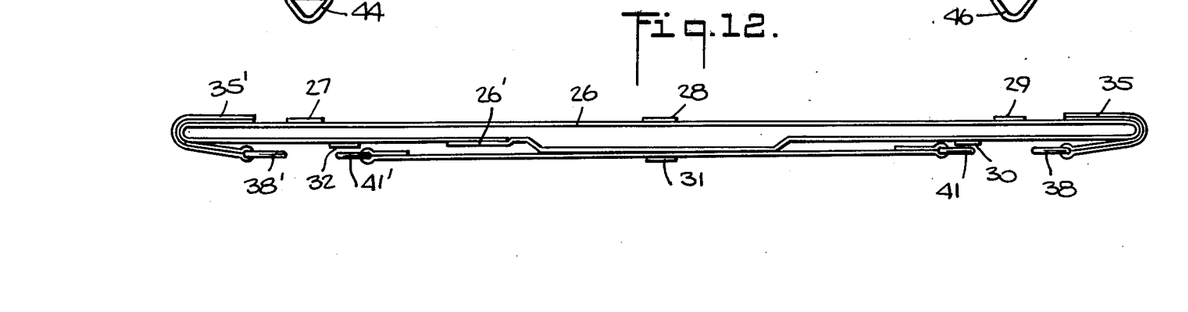
FIG. 12 is a cross sectional view of a shipping harness in accordance with the present invention taken substantially on the vertical plane of line 12—12 of FIG. 11, looking in the direction of the arrows.

In FIGS. 11–13 longitudinal strap 28 is shown positioned in the center of the folded shipping harness 21. When the shipping harness is in position on a loaded collapsible container 11, longitudinal strap 28 is positioned along a longitudinal line at the highest point of the loaded collapsible container 11. Directly opposite and underneath longitudinal strap 28, is positioned longitudinal strap 31. When the shipping harness is in use this would correspond to the longitudinal strap 31 being positioned along the longitudinal center line of cargo box floor 18. Longitudinal straps 30 and 32 are positioned approximately one fourth the distance between longitudinal straps 31 and 28 on either side of longitudinal strap 31.

Longitudinal straps 27 and 29 are so positioned that when they are in place on a loaded collapsible container 11, they will be along a geodesic line of the collapsible container 11. Accordingly longitudinal straps 27 and 29 are positioned approximately one third the distance between longitudinal straps 28 and 31 on either side of longitudinal strap 28.

At the intersection of each of the longitudinal straps 27–37 with circumferential straps 22–26, the intersecting straps are attached to each other by sewing, stapling or like means. Additionally each intersection may be reinforced by the addition of a metal plate or additional strapping material.

One end of anchoring straps 33, 34 and 35 are attached to their respective circumferential straps 22, 24 and 26 at a point between longitudinal straps 29 and 30. Correspondingly, anchoring straps 33', 34' and 35' have one of their ends attached to circumferential straps 22, 24 and 26 between longitudinal straps 27 and 32. The other end of the anchoring straps 33–35, and 33'–35' are attached to triangular anchoring loops 36–38, and 36'–38' by any suitable means. For example, each anchoring loop 36–38 and 36'–38' may have one of its sides encircled by the appropriate end of its respective anchoring strap 33–35, and 33'–35'.

Figure 7:
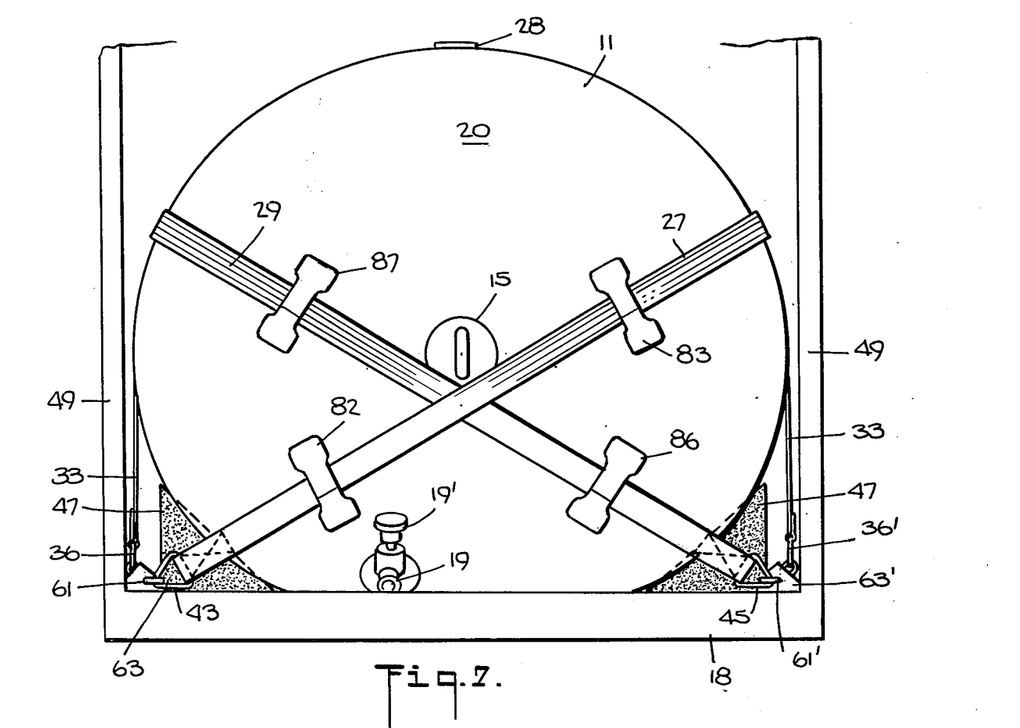
FIG. 7 is a partial cross sectional view of a cargo box having loaded collapsible containers mounted therein in accordance with the present invention, being taken substantially on the vertical plane of line 7—7 of FIG. 6, looking in the direction of the arrows.
Figure 8:
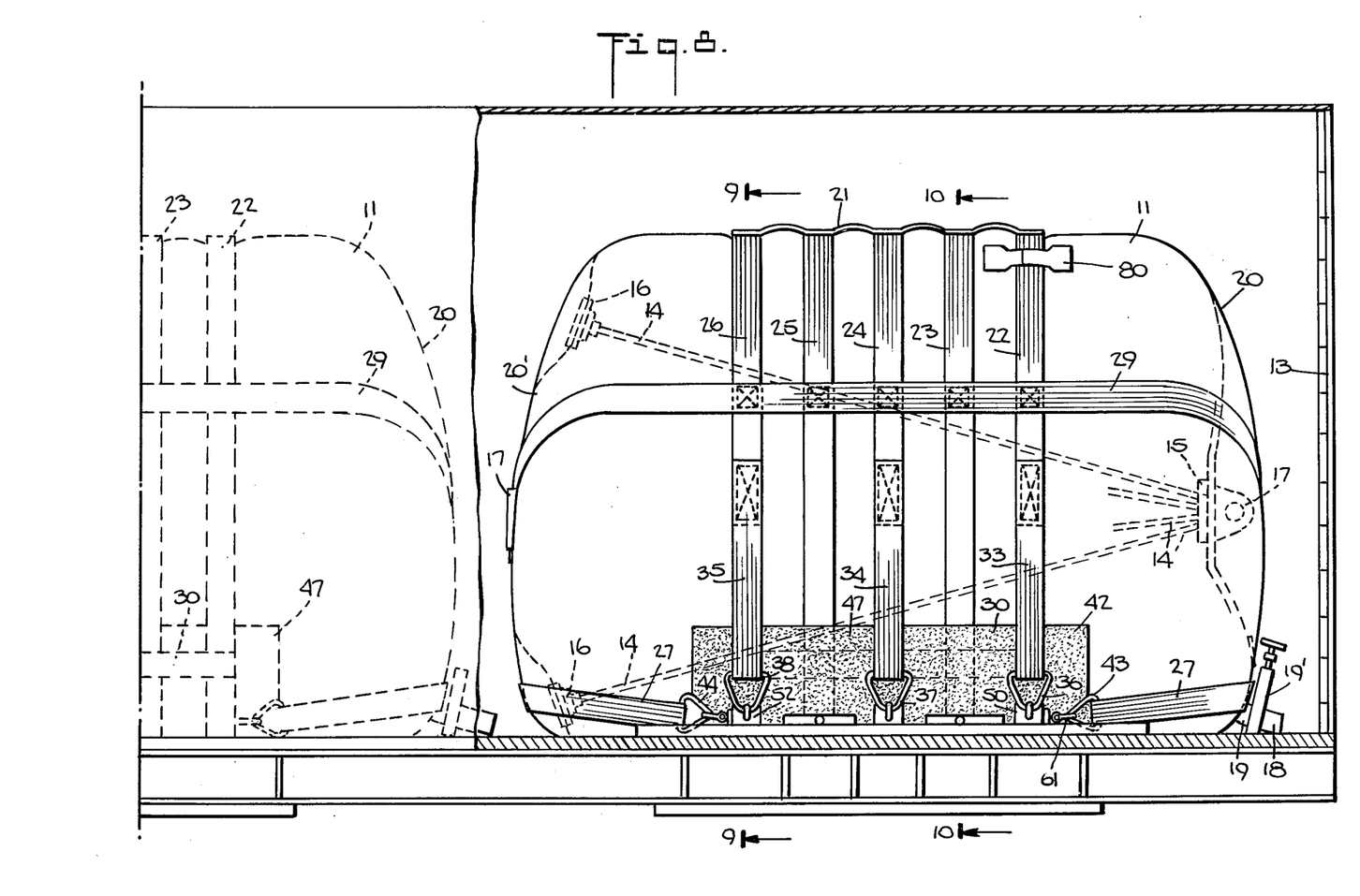
FIG. 8 is a partial side view of the portion of the containerized cargo box of FIG. 1 closest to the cargo box access door, portions of the side wall of the cargo box partially broken away to show a loaded collapsible container and shipping harness in accordance with the present invention.
Figure 9:
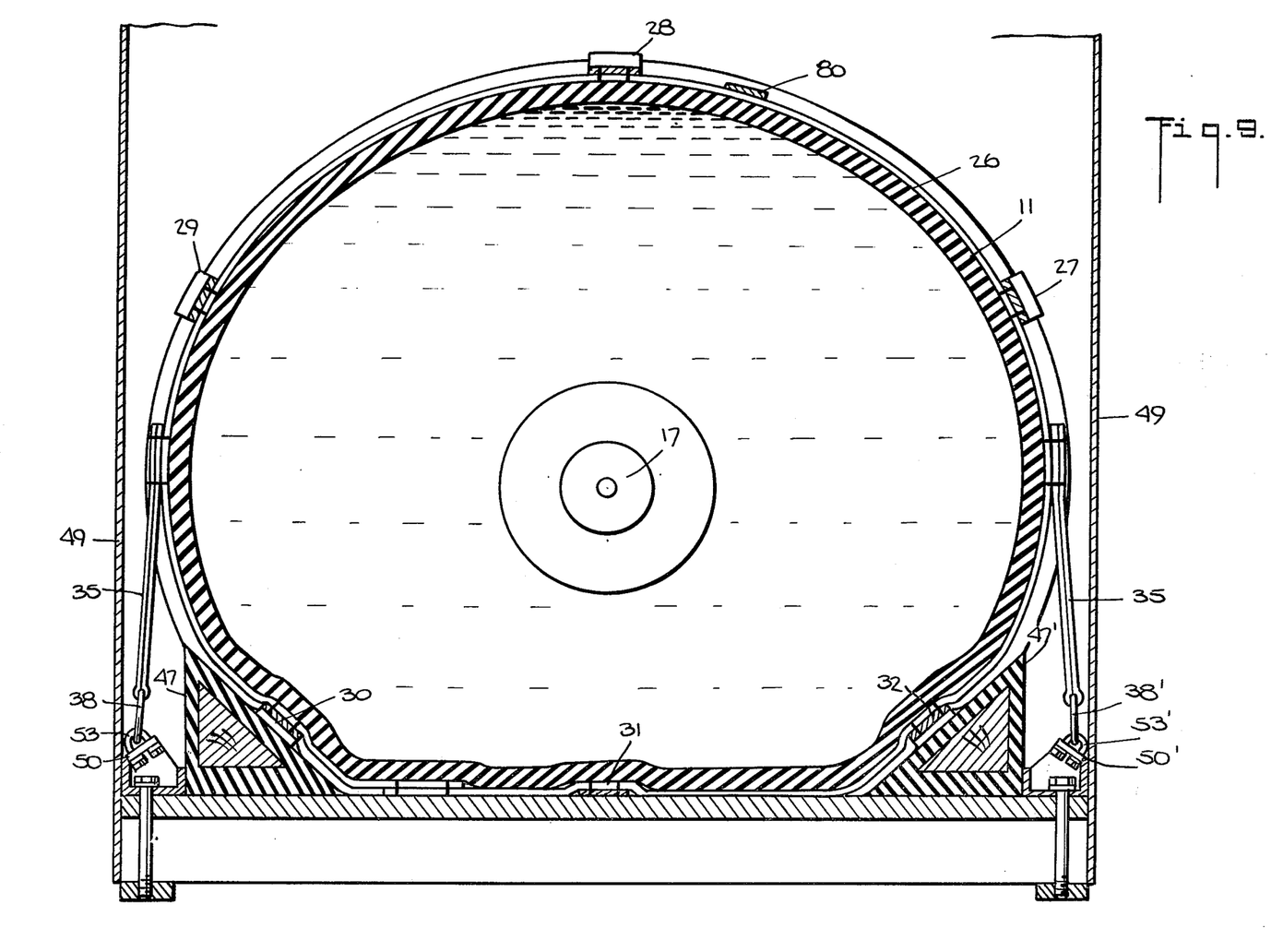
FIG. 9 is a partial sectional view of a containerized cargo box having a loaded collapsible container mounted therein in accordance with the present invention, being taken substantially on the vertical plane of line 9—9 of FIG. 8, looking in the direction of the arrows.
Figure 10:
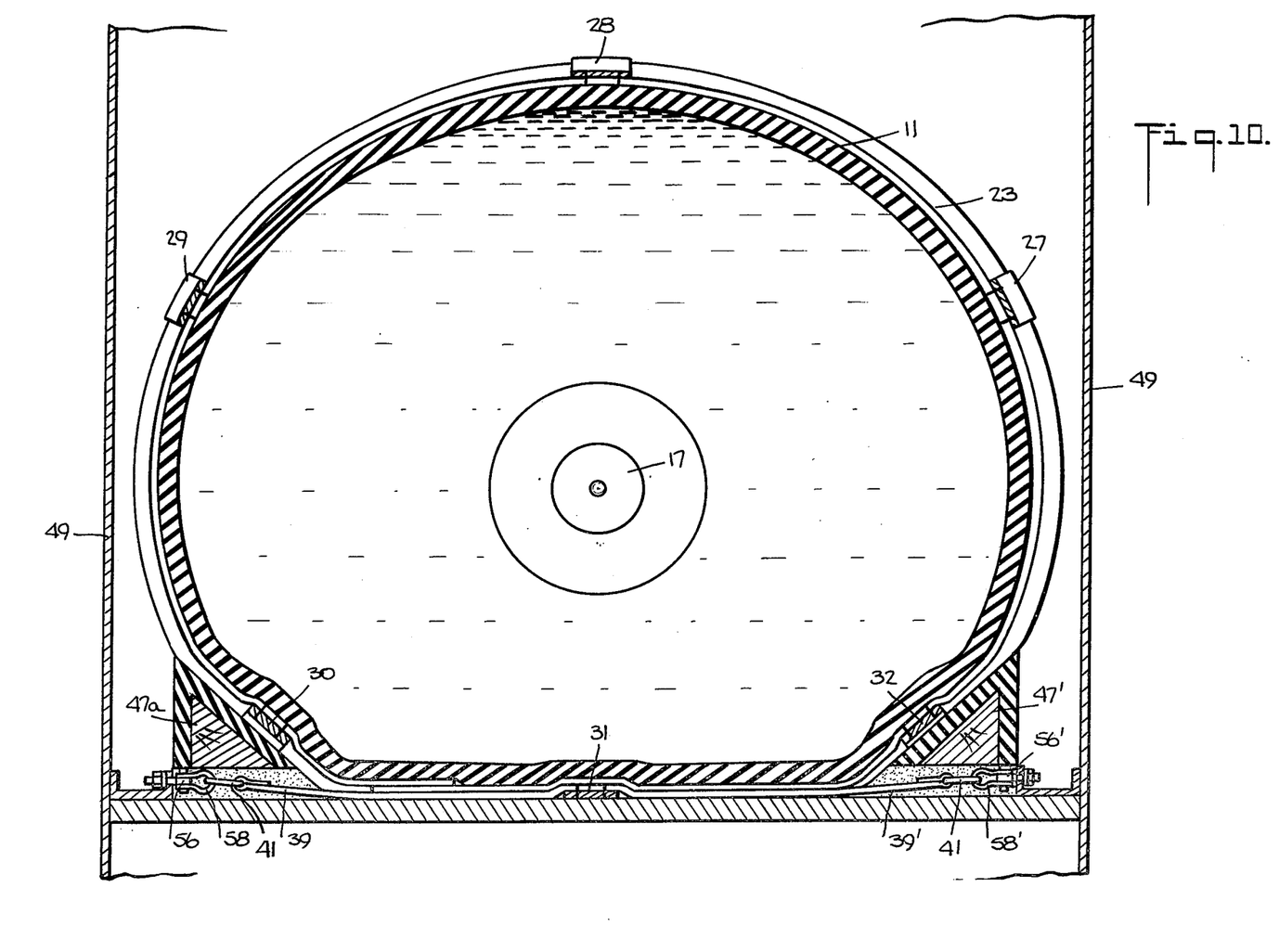
FIG. 10 is a partial sectional view of a containerized cargo box having a loaded collapsible container mounted therein in accordance with the present invention, being taken substantially on the vertical plane of line 10—10 of FIG. 8, looking in the direction of the arrows.

As can be most clearly seen in FIGS. 7 and 9, anchoring straps 33–35 and 33'–35' and their corresponding anchoring loops 36–38 and 36'–38' are so positioned and of such a length as to allow them to be attached to the cargo box floor 18.

As can be seen most clearly in FIG. 13, circumferential straps 23 and 25 have anchoring straps 39 and 40 attached thereto. Anchoring straps 39 and 40 extend parallel to their respective circumferential straps 23 and 25 for an equal distance on either side of strap 31. Anchoring strap 39 is attched to longitudinal strap 31 and circumferential strap 23 at their point of intersection by sewing or other suitable means. In like manner circumferential strap 25, anchoring strap 40 and longitudinal strap 31 are attached at their intersection. For added reinforcement, anchoring straps 39 and 40 may be attached to their respective circumferential straps 23 and 25 for a distance on either side of their intersection with longitudinal strap 31. Anchoring straps 39 and 40 have triangular anchoring loops 41, 41', 42 and 42' respectively attached to their extremities. As will be more fully discussed hereinafter, anchoring straps 39 and 40 are of a length and so positioned that their respective anchoring loops 41, 41', 42 and 42' may be attached to the cargo box floor 18 near the side walls 49 of the cargo box 10.

Longitudinal straps 27 and 29 have triangular anchoring loops 43 and 44, and 45 and 46, respectively, attached to their extremities. Longitudinal straps 27 and 29 with their respective anchoring loops 43–46 are each of sufficient length to allow them to be positioned along a geodesic line in the upper portion of the collapsible container 11 and across both its end faces 20 and 20' for attachment to the cargo box floor 18 as shown. Since it is desired that longitudinal straps 27 and 29 firmly grip the collapsible container 11, their overall length should be slightly less than the distance along a geodesic line of container 11 between their respective anchoring points in the cargo box floor 18. For example when the longitudinal straps 27 and 29 are formed from 4 inch strips of nylon, then each of the longitudinal strips 27 and 29 should be 1½ percent shorter.

When the shipping harness 21 is in used to restrain movement of a loaded collapsible container 11 positioned on its side in a cargo box 10, each of the circumferential straps 22–26 is positioned about the collapsible container 11 progressively along the container's length. Short longitudinal straps 28–31 are positioned longitudinally along the highest and lowest portions of the collapsible container 11. Longitudinal straps 27 and 29 are positioned longitudinal along the upper portion of the collapsible container 11 and across both faces 20 and 20' of the collapsible container 11. Short longitudinal straps 30 and 32 are positioned longitudinally between the lower portion of the sides of the collapsible container and respectively wedges 47 and 47' which act to help hold the collapsible container 11 in place.

Figure 3:
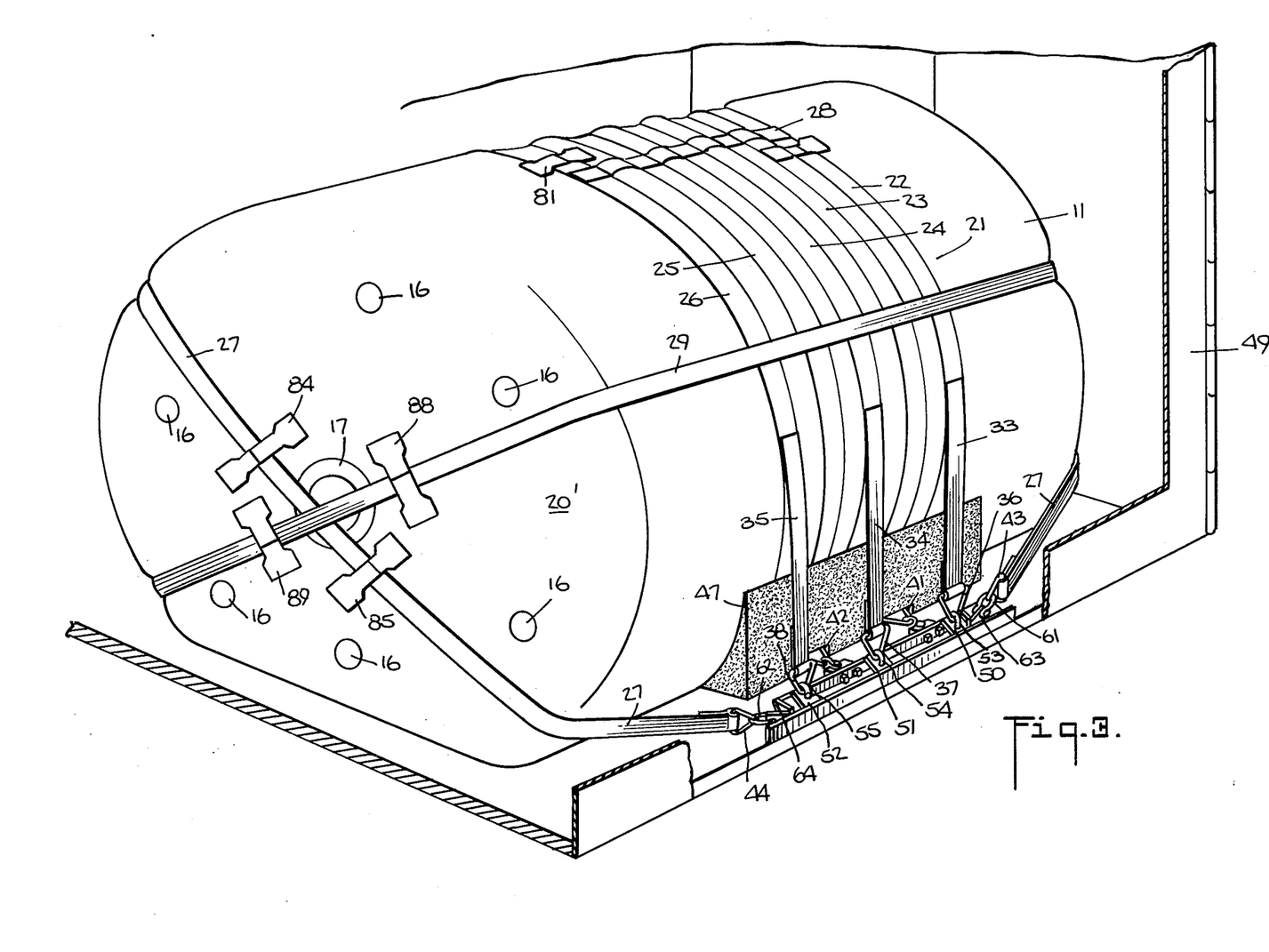
FIG. 3 is a partial prospective view of the portion of the cargo box in FIG. 1 closest to the cargo box access doors, portions of the containerized cargo box being partly broken away to show a loaded collapsible container and shipping harness in accordance with the present invention.
Figures 4, 14, 15:
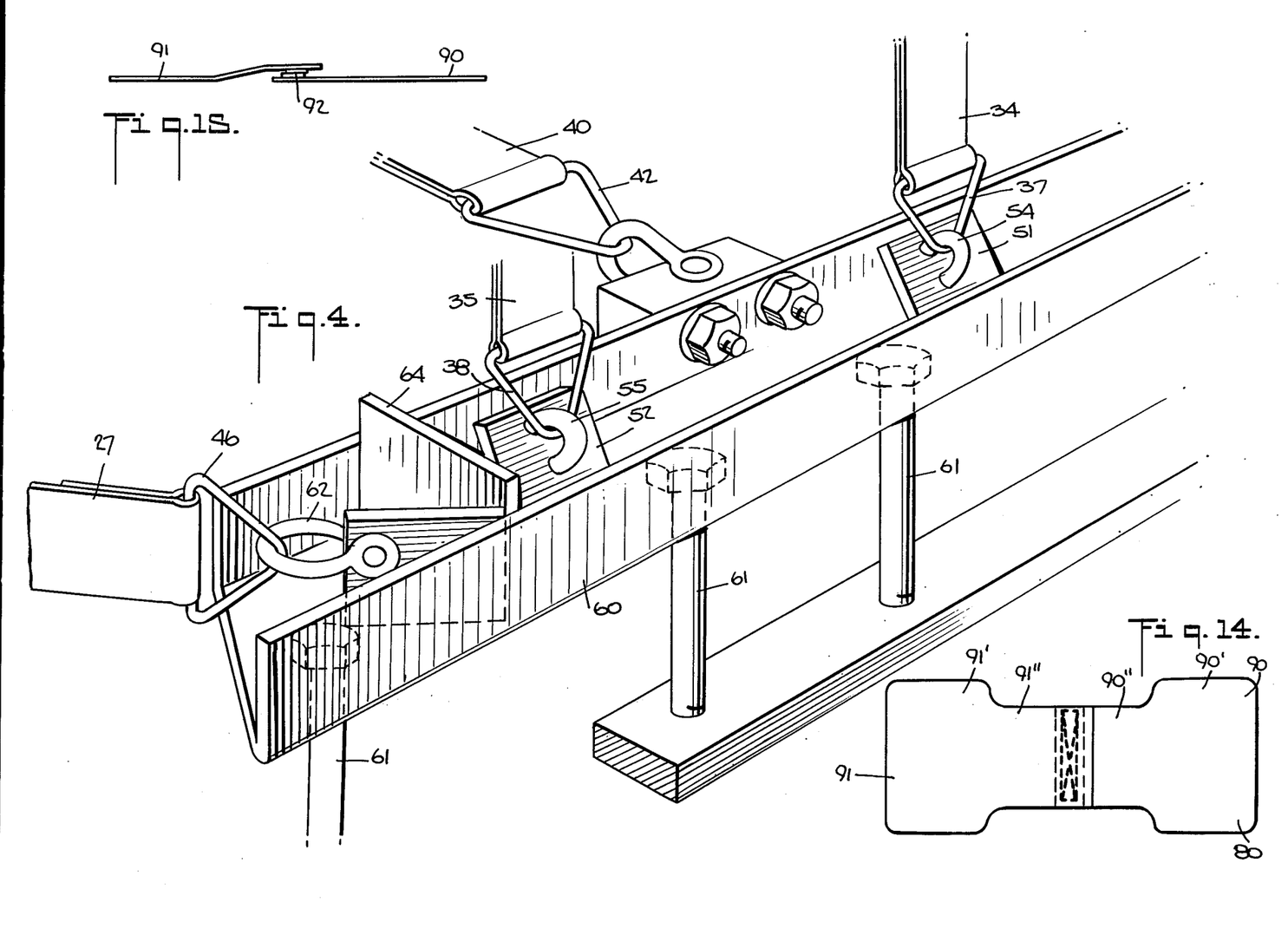
FIG. 4 is a partial prospective view of the attaching means for securing the shipping harness to the cargo box and portions of the shipping harness of the present invention connected thereto.
FIG. 14 is a top view of a restraining means for use in the present invention.
FIG. 15 is a side view of a restraining means for use in the present invention.
Figure 5:
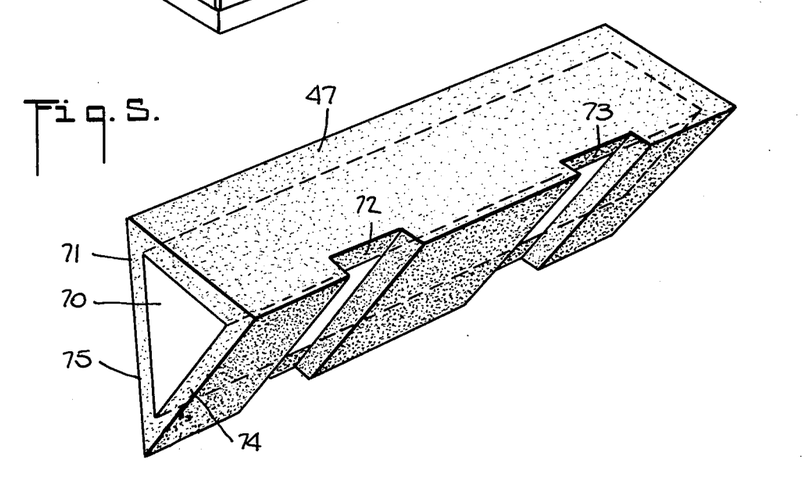
FIG. 5 is a prospective view of a mounting wedge a loaded collapsible container and shipping harness in accordance with the present invention.
Figure 6:
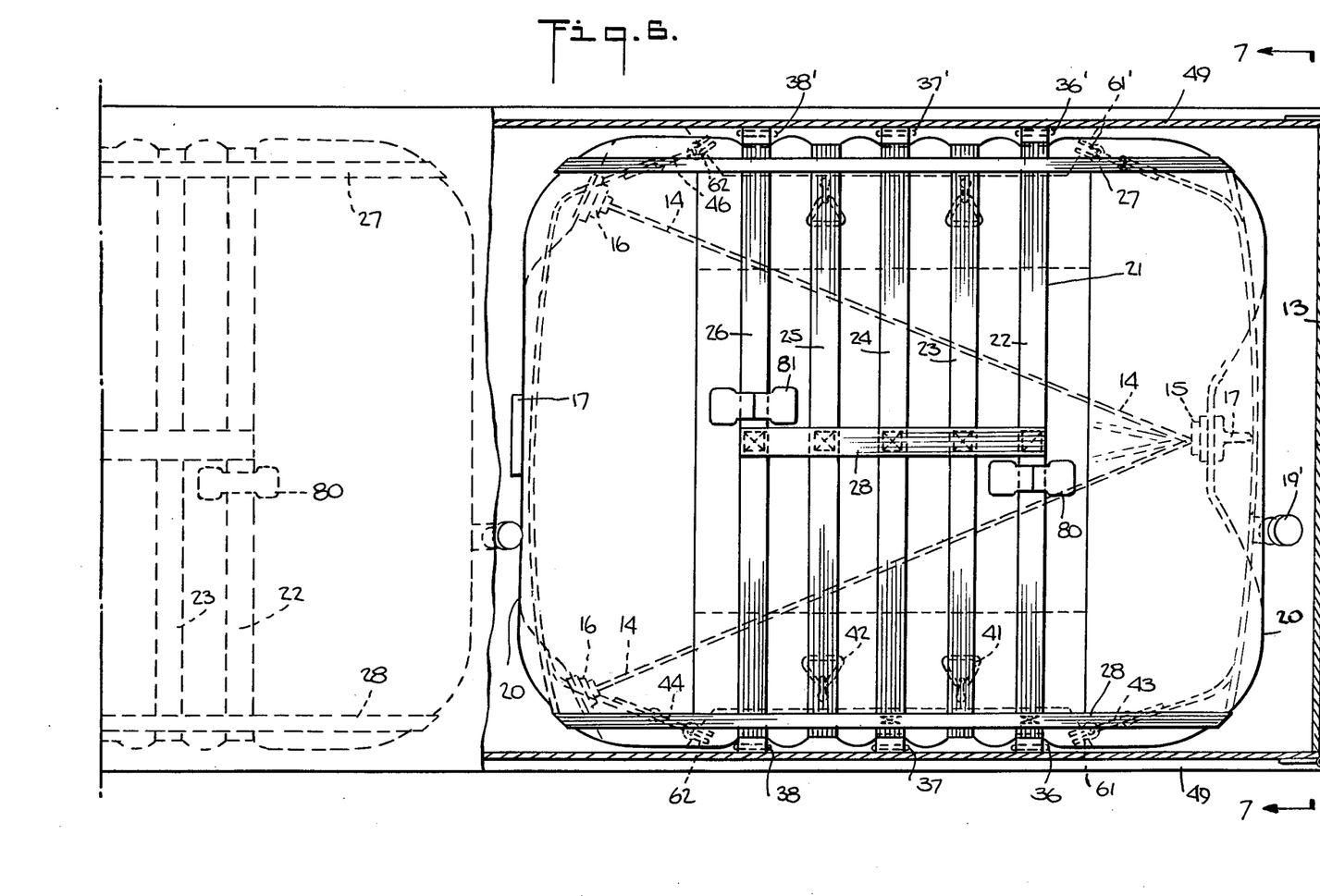

As can be seen most clearly in FIGS. 3 and 4, each of the circumferential straps 22–26 is held in position against movement by anchoring straps 33–35 and 33'–35', 39 and 40 by their attachment to attaching rails 60 and 60'. Attaching rails 60 and 60' are bolted to the cargo box floor 18 on either side of each collapsible container 11 by means of bolts 61. Looking only at the anchoring straps positioned closest to attaching rail 60, anchoring straps 33–35 when attached to rail 60 are positioned almost vertically between circumferential straps 22, 24 and 26 and the attaching rail 60. Anchoring loops 36–38 of the anchoring straps 33–35 are respectively attached to vertical support plates 50, 51 and 52 by means of mounting eyes 53, 54 and 55 attached to the support plates 50–52. Mounting eyes 53–55 are detachably mounted on plates 50–52 by bolts or other suitable means which would allow the triangular anchoring loops 36, 37 and 38 to be positioned therein. Plates 50, 51 and 52 may be attached to the anchoring rail 60 by bolting, welding or any other suitable method.

Anchoring straps 39 and 40, attached to circumferential straps 23 and 25 respectively, are positioned underneath each collapsible container 11. The anchoring straps are attached by means of triangular anchoring loops 41 and 42 to mounting eyes 58, 59 which are in turn detachably mounted to horizontal support plates 56 and 57. Support plates 56 and 57 are also attached to attaching rail 60 by bolting, welding, or other suitable means.

Circumferential straps 22-26 are attached to rail 60' by anchoring straps 33'-35', 39 and 40 in a like manner.

Longitudinal strap 27 is held in position by its triangular anchoring loops 43 and 44 which are interconnected respectively to detachable eyes 61 and 62 mounted on support plates 63 and 64. Plates 63 and 64 are attached to attaching rail 60 by any suitable means. Equally the ends of longitudinal strap 29 are held in position by the interconnection of triangular anchoring loops 45 and 46 with detachable eyes 61' and 62' of attaching plates 63' and 64' connected to attaching rail 60'.

The cross-sectional configuration of supporting wedges 47 and 47' is that of a right triangle. Supporting wedges 47 and 47' each have a core 70 of a rigid material, such as wood, surrounded by a shock absorbent material 71, such as resilient rubber or plastic. Alternatively the supporting wedges 47 and 47' may be formed entirely of a slightly resilient material such as hard rubber or the like. In use, supporting wedge 47 is positioned between the collapsible container 11 and anchoring straps 33-35 and supporting wedge 47' between the side of collapsible container 11 and anchoring straps 33'-35'. Supporting wedge 47 has two passageways 72 and 73 across its bottom surface to allow the passing of anchoring means 39 and 40 between the collapsible container 11 and the anchoring rail 60. Similar supporting wedge 47' has passage 72' and 73' for entry to anchoring rail 60'. Anchoring strap 30 is so positioned on the shipping harness 21 that it falls between the walls of collapsible container 11 and the angled surface 75 of supporting wedge 47. Equally anchoring strap 32 lies between surface 75' of wedge 47' and the surface of the collapsible containers.

Since encircling straps 22-26 are of a similar circumference than that of a loaded collapsible container 11, the straps 22-26 are in tight engagement with the collapsible container 11 sufficient to prevent any relative movement between them. Accordingly since circumferential straps 22-26 are prevented from both rotational, longitudinal and side movement by anchoring straps 33-35, 33'-35', 39 and 40, in conjunction with anchoring rails 60 and 60', the collapsible container 11 is also prevented from such movement. Longitudinal straps 27 and 29 also act to prevent movement of both the shipping harness 21 and collapsible container 11 both by their attachment to the shipping harness 21 and their tight engagement with the collapsible container 11.

However when collapsible containder 11 is less than full, for example during unloading or loading, the shipping harness 21 would not be in tight engagement with its collapsible container 11. This would, of course, allow movement of the collapsible container 11 relative both to the shipping harness 21 and to the cargo box 10. To prevent such movement each collapsible container 11 has positioned thereon restraining means 80-89 which cooperate with the shipping harness 21 to hold the collapsible container 11 in a relatively fixed position, even when such container is emptied or only partially filled.

Each of the restraining means 80-89 are constructed in the same manner. As can be seen most clearly in FIG. 14 with regard to restraining means 80, the restraining means 80 is composed of two elements 90 and 91, each having a slightly enlarged end portion 90' and 91' and a slightly narrower strap or tongue portion 90" and 91". The enlarged end portions 90' and 91' are fixedly attached to the body of the collapsible container 11 by vulcanization or by the use of adhesive. The thinner portions 90" and 91" are connected to the collapsible container 11 by enlarged portions 90' and 91'. The ends of each of the thinner portions 90", and 91" can be attached to each other by means, such as snaps, buttons, zippers or fabric fasteners which allow them to be opened and closed. In use, restraining means 80 has its two elements 90 and 91 affixed permanently to collapsible container 11 on either side of circumferential strap 22 near longitudinal strap 28. The two narrower or tongue elements 90' and 91" are positioned across circumferential strap 22 so that they may be opened or closed around said strap 22 to retain the strap in position. The restraining means 81 is similarly positioned about circumferential strap 26. Longitudinal strap 27 has associated with it restraining means 86 and 87 on face 20 and 88 and 89 on face 20'.

To load cargo box 10, two collapsible containers 11 are mounted in their harnesses 21. Their restraining means 80-89 are closed to hold the harness in fixed relationship to their respective empty collapsible containers 11. Supporting wedges 47 and 47' are positioned against respective anchoring rails 60 and 60'. Each of the collapsible containers 11, with its respective harness 21, is then placed on its side between one of the sets of the supporting wedges 47 and 47' with face 20 closest to the cargo access door 13. Thereupon the various triangular anchoring loops 36-38, 36'-38', 41-42, 41'-42' and 43-46 are attached to the attaching rails 60 and 60' as described above. After all attachments have been made to attaching rail 60 and 60', both containers 11 are evacuated, and sealed by closing valves 19'. An inlet hose is attached to inlet pipe 19 of the collapsible container 11 furthest from the cargo access door 13. Valve 19 is opened and the liquid to be shipped is pumped under pressure into the evacuated collapsible container 11 until a preset pressure is reached. Valve 19' is then closed and the process is repeated with regard to the collapsible container 11 nearest cargo box access door 13.

In unloading the collapsible containers, the same process is followed in reverse, with the collapsible container 11 closest to the access door 13 being unloaded first and then the collapsible container 11 furthest from said access door 13 being emptied.

Evacuating the container before loading insures that there will be no air bubble remaining in the collapsible container and eliminates the need for a venting system for use during loading. Since, after the initial evacuation, the valve 19" will only be open when inlet pipe 19 is receiving or unloading liquid, it is possible to continue to load and unload collapsible container 11 without further evacuations.

When it is necessary to return the collapsible container 11 for refilling, the collapsible containers 11 and the shipping harnesses 21 from many cargo boxes 10 may be packed into one cargo box 10. The remaining cargo boxes may then be used for transportation of other cargo.

Since the collapsible containers 11 are to be filled to the same pressure on each trip, the various straps forming the shipping harness can be cut to the exact length necessary to insure that they will be under the required tension in use. If however it is impossible to maintain such constant pressure because of the nature of the cargo or for other reasons, turnbuckles or the like can be connected between each of the anchoring loops 36–38, 36'–38', 41–42, 41'–42' and 43–46 and attaching rails 60 and 60' to allow slight alterations in the effective length of the straps 27, 29, 33–35, 33'–35', 39–40 and accordingly adjust the tensions in the straps.

While the shipping harness of the present invention has been shown in connection with containerized cargo boxes, it may be used to position and hold flexible containers to the beds of trucks and railroad cars, to shipping pallets, or for permanent mounting of such containers in warehouses and the like locations. In addition to the preferred embodiments disclosed above, many modifications in the construction and method of use of the invention can be made which fall within the teachings of the present invention.

Having just described the invention what I claim and desire protection by letters patent are:

1. A shipping harness for securing a non-rigid container against movement on a platform support means comprising a plurality of continuous flexible straps forming closed loops for encircling the non-rigid container, each of said encircling straps spaced from each other by a plurality of flexible straps positioned across and attached to said encircling straps, at least some of said encircling straps having a pair of separate anchoring straps on opposite sides for holding the container on and in a fixed relation to said platform support means.

2. The shipping harness of claim 1 wherein at least one end of at least one of the flexible straps positioned across said encircling straps extends beyond said encircling straps a sufficient distance to be used to hold the shipping harness on and in a fixed relation to a support means.

3. The shipping harness of claim 1 wherein several of the encircling straps have anchoring straps attached thereto, and wherein at least one of the anchoring straps is attached at a relative position along its encircling strap different than the positioning of another of the anchoring straps along its encircling strap.

4. The shipping harness of claim 3 wherein each of the anchoring straps has means for attaching said anchoring strap to a support means.

5. The shipping harness of claim 4 wherein the flexible strap which has at least one of its ends extending beyond the encircling straps, has at that end, means for attaching said extended strap to a support means.

6. The shipping harness of claim 1 wherein the circumference of each of the encircling straps is slightly less than the corresponding circumference of the non-rigid container along which the encircling strap is to be positioned.

7. The shipping harness of claim 1 wherein the non-rigid container on which the harness is to be used is generally cylindrical in configuration and wherein the circumference of each of the encircling straps is slightly less than the circumference of said cylinder.

8. A shipping harness for use with a cyclindrical non-rigid container comprising a plurality of continuous flexible straps forming closed loops, all having the same circumference, which circumference is slightly less than that of the non-rigid container, said continuous straps being positioned and held parallel to each other by a plurality of longitudinal straps attached to said encircling straps, at least one of said longitudinal straps extending across the encircling straps, and at least one of said longitudinal straps having at least one of its ends extending sufficiently beyond said encircling straps to allow said extended longitudinal straps to be attached to a platform support means, each of the encircling straps having a pair of separate anchoring straps for attaching said container to said platform support means.

9. The shipping harness of claim 8 wherein at least one of said anchoring straps is attached at a relative position along its encircling strap different than the positioning of another of the anchoring straps along its encircling strap.

10. The shipping harness of claim 8 wherein each of the anchoring straps and the extended longitudinal strap has means for attaching it to a support means for holding said harness in position.

11. A shipping system for liquids and dry powders consisting of a generally cyclindrical non-rigid container mounted on its side and held in position on a platform support means by a shipping harness, said shipping harness consisting of a plurality of continuous flexible straps forming closed loops for encircling the non-rigid container said strips positioned and held parallel to each other by a plurality of longitudinal straps attached to said encircling straps, each of the encircling straps having attached thereto a pair of separate anchoring straps, all anchoring straps secured to said platform.

12. The shipping system of claim 11 wherein the non-rigid container is generally cyclindrical in shape and wherein the circumference of the encircling straps are slightly less than the circumference of said non-rigid container.

13. The shipping system of claim 11 wherin at least one of said longitudinal straps is of length to extend across the encircling straps.

14. The shipping system of claim 13 wherein at least one of said longitudinal straps has an end which extends sufficiently beyond said encircling straps to allow said extended strap to be attached to the support means.

15. The shipping system of claim 14 wherein said strap which extends beyond said encircling strap is positioned along a geodesic line on the surface of said non-rigid container.

16. The shipping system according to claim 11 wherein there are two anchoring straps on at least one of said encircling straps.

17. The shipping system of claim 11 wherein the non-rigid container is in contact with the support means and wherein one of the anchoring straps is attached to its encircling strap where the encircling strap is positioned between and is in contact with both the non-rigid container and the support means.

18. The shipping system of claim 11 wherein the non-rigid container has attached thereto means for holding at least some of the straps forming said shipping harness to said non-rigid container.

19. Shipping system of claim 11 wherin the non-rigid containers is positioned in a cargo box and wherein the support means consists of the floor of said cargo box.

20. The shipping system of claim 19 wherein the shipping harness is attached to the support means by two elongated members to which the anchoring straps are detachably mounted, said elongated members are positioned along and on either side of said non-rigid container.

21. The shipping system of claim 20 wherein means for laterally supporting said non-rigid containers are positioned between said elongated members and the non-rigid container.

* * * * *